No. 758,898. PATENTED MAY 3, 1904.
C. E. CURTISS.
FEEDER FOR SHREDDING MACHINES.
APPLICATION FILED DEC. 30, 1902.
NO MODEL. 4 SHEETS—SHEET 1.

No. 758,898. PATENTED MAY 3, 1904.
C. E. CURTISS.
FEEDER FOR SHREDDING MACHINES.
APPLICATION FILED DEC. 30, 1902.
NO MODEL. 4 SHEETS—SHEET 2.

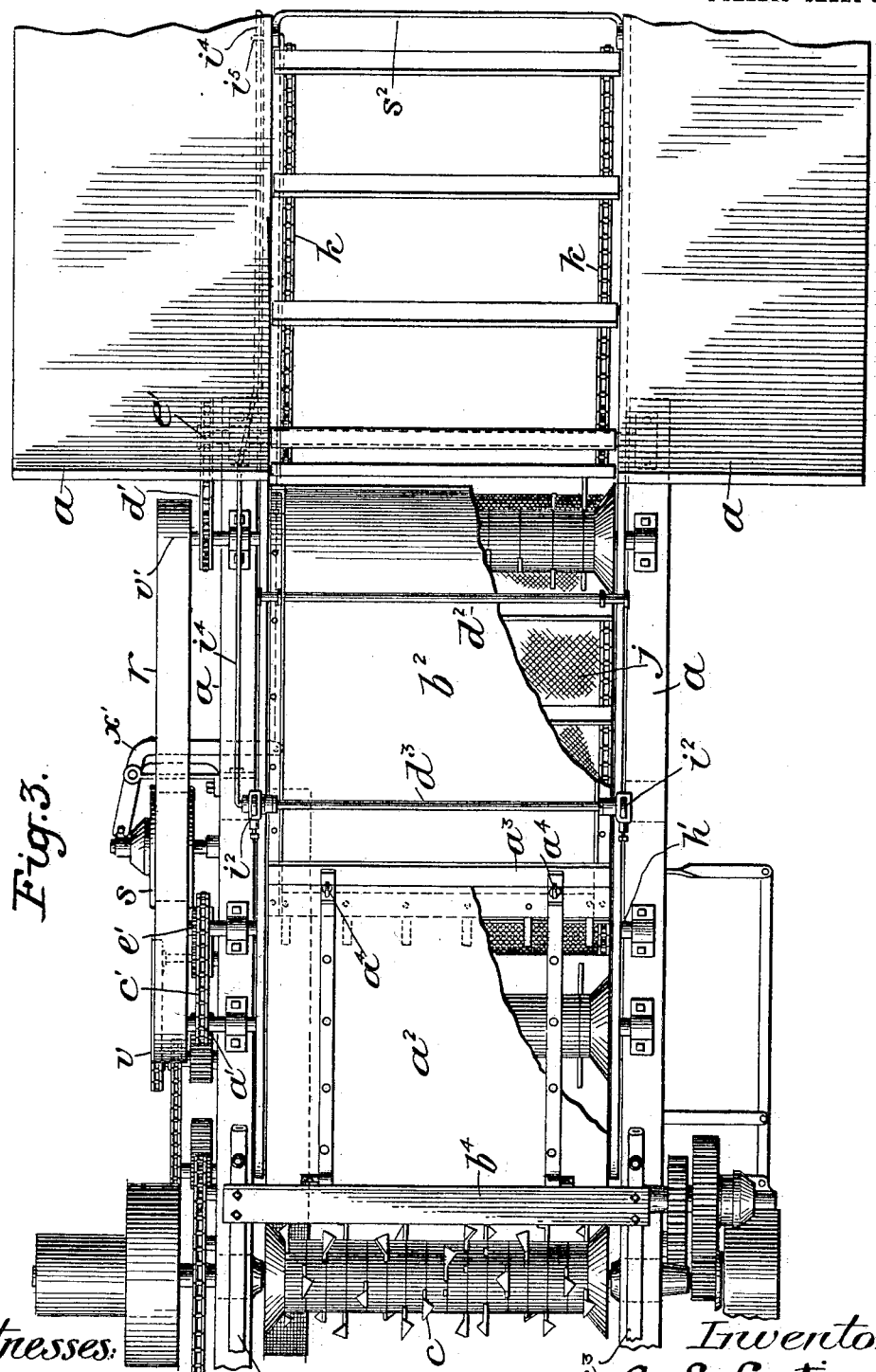

No. 758,898. PATENTED MAY 3, 1904.
C. E. CURTISS.
FEEDER FOR SHREDDING MACHINES.
APPLICATION FILED DEC. 30, 1902.
NO MODEL. 4 SHEETS—SHEET 4.
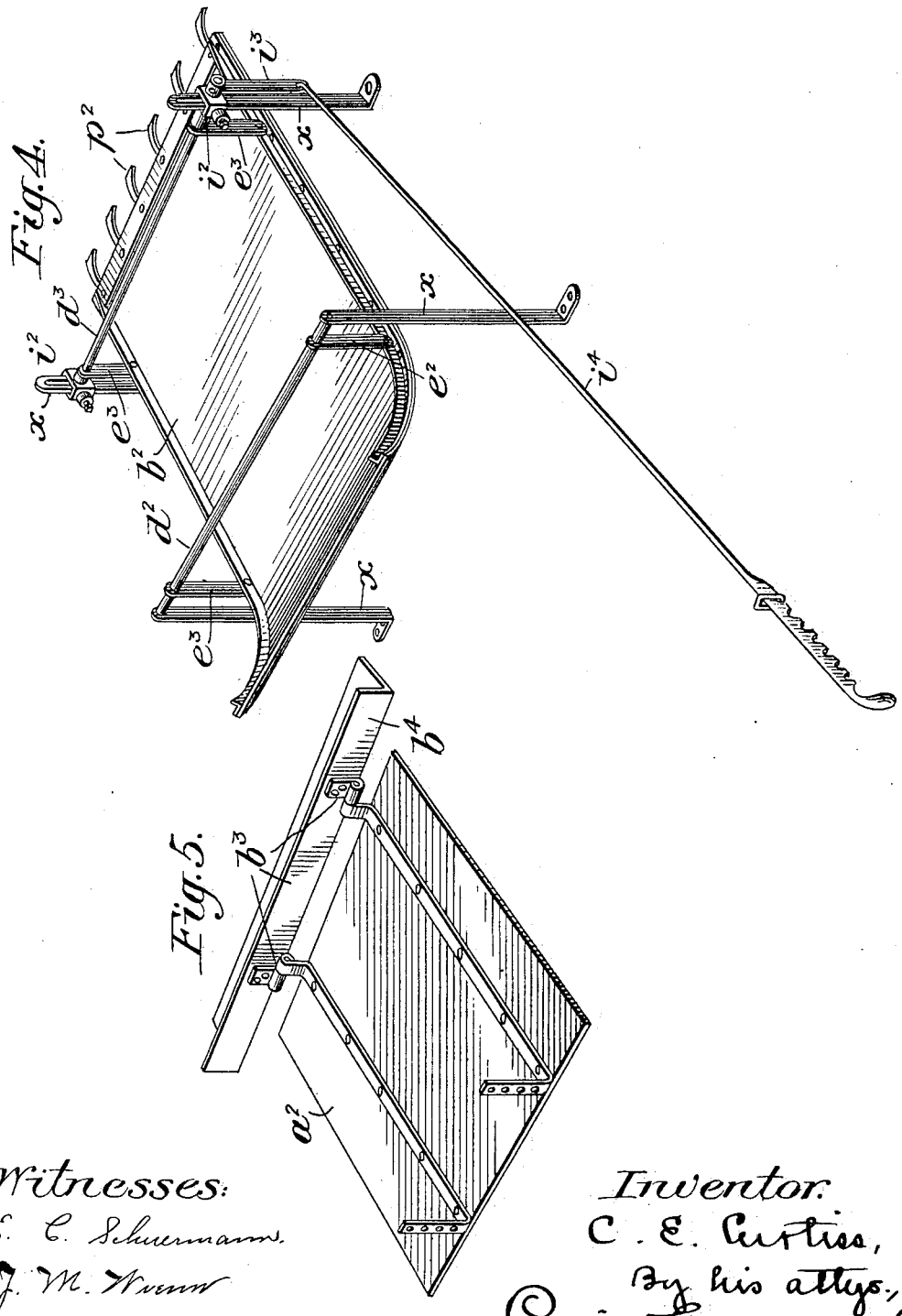

No. 758,898. Patented May 3, 1904.

UNITED STATES PATENT OFFICE.

CHARLES E. CURTISS, OF CHICAGO, ILLINOIS, ASSIGNOR TO INTERNATIONAL HARVESTER COMPANY, OF CHICAGO, ILLINOIS, A CORPORATION OF NEW JERSEY.

FEEDER FOR SHREDDING-MACHINES.

SPECIFICATION forming part of Letters Patent No. 758,898, dated May 3, 1904.

Application filed December 30, 1902. Serial No. 137,105. (No model.)

*To all whom it may concern:*

Be it known that I, CHARLES E. CURTISS, a citizen of the United States, residing at Chicago, county of Cook, State of Illinois, have invented certain new and useful Improvements in Feeders for Shredding-Machines; and I do hereby declare the following to be a full, clear, and exact description of the invention, such as will enable others skilled in the art to which it appertains to make and use the same.

The invention has to do with machines for cutting and shredding cornstalks and blades for fodder, and relates particularly to the means for feeding the stalks into the machine. It is intended more especially for feeding the stalks of crops that have been harvested by automatic corn-binders where the stalks are bound into bundles; and the particular object of the invention is to provide a combined stalk-feeder and band-cutter where the cutters operate on the under side of the ingoing stalks and, without interfering with the feeding function of the forwarding-belts, are constructed and arranged to facilitate the spreading out of the stream of ingoing material and assist in feeding the stalks forward to the snapping-rolls and prevent the clogging of the machine at the entrance to these rolls.

It consists, chiefly, of a pair of cutters located as above described with respect to the mass of ingoing stalks and a feeding belt or conveyer located between the cutters. Preferably also it includes an auxiliary feeder-belt serving to deliver the stalks to the main feeder, whence they are conveyed directly to the snapping-rolls. One of the cutters is located between the delivery end of the main feeder and these rolls, and it is intended, primarily, to keep the entrance to the rolls clear. The function of the other cutter is principally to sever the bands around the bundles. Both cutters serve the additional purpose of assisting to spread out the stalks as the stream passes on to the shredder and assist the belts in keeping the mass moving regularly toward the snapping-rolls.

The invention is illustrated in the accompanying drawings, wherein—

Figure 1:
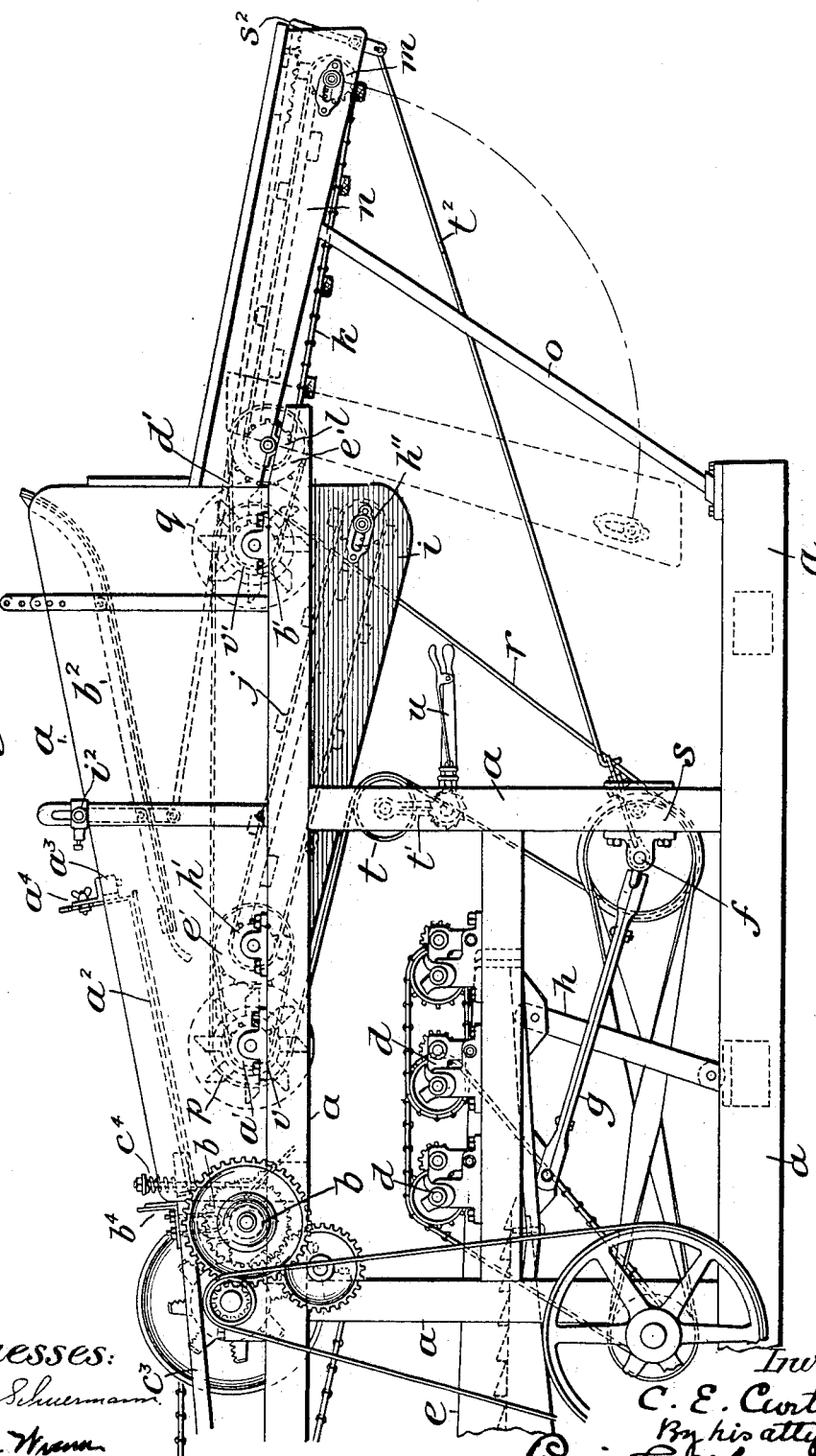
Figure 2:
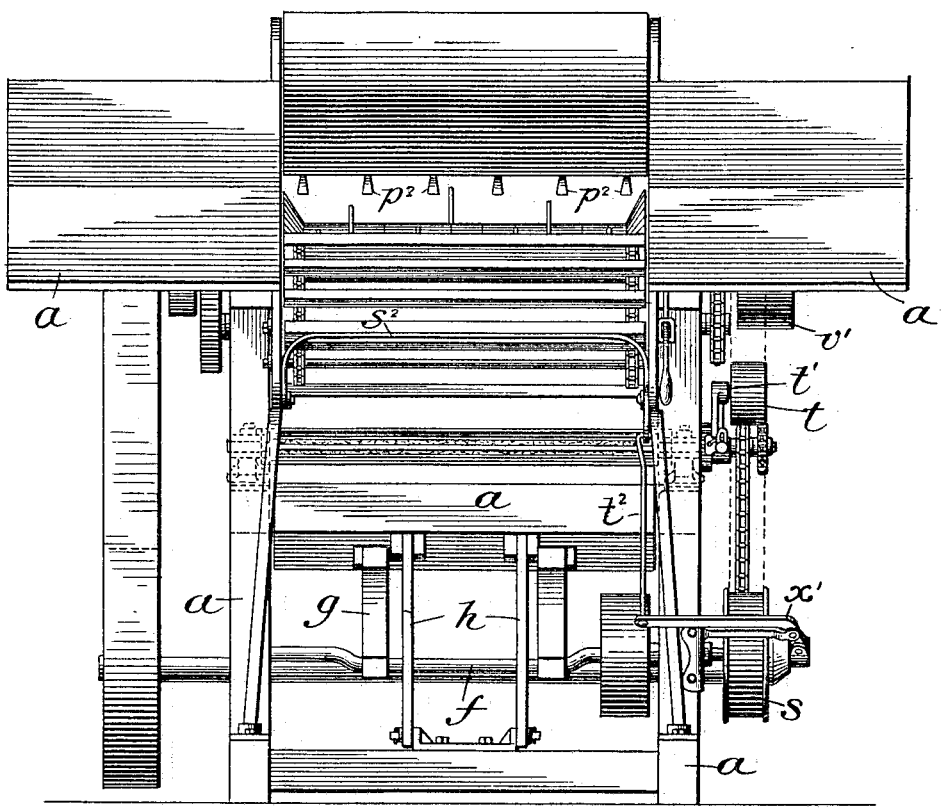

Figure 1 is a side elevation of the feeding end of a type of shredders that is now well known. Fig. 2 is an end view thereof looking into the machine. Fig. 3 is a plan view, and Figs. 4 and 5 are detail views of certain aprons that are arranged over the feed-trough.

Referring to the views, $a\ a$ denote various parts of the framing of the machine, which may be constructed in any desired manner.

The snapping-rolls are indicated at $b\ b$, Fig. 1, in dotted lines, and $c$ denotes a revolving cylinder armed with knives for cutting and shredding the stalks as they emerge from the snapping-rolls. The ears as they are snapped off by the rolls $b$ fall onto husking-rolls at $d$, and the cut and shredded stalks and blades, with the chaff, &c., fall onto the shaker $e$, which is vibrated to and fro from the shaft $f$ by means of a pitman $g$, the front end of the shaker being supported by a pivoted post $h$.

As thus far described, the machine may be considered as of the usual construction, as the invention has to do only with other parts, which will now be described.

The upper sills carry two rollers $h'$ and $h''$, the former being at about the level of the passage between the snapping-rolls and the roller $h''$ being preferably at a somewhat lower level and mounted in bearings carried by brackets $i$. Around these rollers the slatted canvas feeding-belt $j$ travels, the different elevations of the rollers giving an upward inclination to the belt toward the feeding end of the shedder, as shown in Fig. 1, and this belt constitutes the feeder proper of the machine.

The upper sills $a$ project beyond the front end of the feeder-belt $j$, and an auxiliary feeder-belt $k$ travels around sprockets $l\ m$, that are journaled in a frame $n$, that is pivoted upon the shaft of the roller $l$, so that it and the belt $k$ may be let down into the position shown in dotted lines or raised up and supported by a prop $o$ or other means, as required for the convenience of the operator. Incidentally this adjustment gives the auxiliary belt any desired inclination relative to the main belt $j$, to which the stalks are delivered as they are laid upon the auxiliary belt by the attendant. The adjustment of the frame $n$ and the inclination of the auxiliary belt are by no means essential to the successful operation of the machine and are provided, as above stated, mainly to place the end of the belt at a convient height for the operator.

Immediately in front of the snapping-rolls $b$ there is mounted in suitable boxes secured to the side sills a rotary or otherwise-moving cutter $p$, consisting in the present instance of a cylinder armed with knives having edges curved or inclined toward the rear relative to their direction of rotation. This rotary cutter is parallel with the drive-roller $h'$ of the main feeder-belt $j$, and in consequence of its proximity to the point of entrance of the stalks between the rolls it serves to clear the throat in advance of the rolls and prevent clogging of the machine at this point and also assists the belt in forwarding the stalks to the rolls. Another cutter $q$, also preferably rotary, is arranged just in rear of the auxiliary feed-belt $k$, immediately over the front end of the main feeder, and serves as a band-cutter. The upper surfaces of both cutters are about on a level with the space between the snapping-rolls and each operates on the under side of the bundles or mass of ingoing corn, serving to aid the belts in the operation of feeding the stalks. In this manner the underneath part of the ingoing stream of corn is forwarded, while the overlying stalks are retarded by certain overhead aprons that will presently be described in case there is a greater mass of corn than can be disposed of.
The rotary cutters are driven by a belt $r$ from a pulley $s$ on the shaft $f$, which vibrates the shaker. The belt passes around a tightener $t$, that is carried by an arm $t'$ and made adjustable by a hand-lever $u$. From this tightener the belt passes under a pulley $v$ on the shaft of the cutter $p$, and thence it passes over the pulley to a corresponding pulley $v'$ on the shaft of the band-cutter $q$, whence it returns to the drive-pulley $s$. The shafts of the cutters $p\ q$ also serve as drivers for the feed-belts $j\ k$, and in Fig. 1 it will be seen that the cutter-shafts are provided with sprocket-wheels $a'\ b'$, respectively, which, by means of sprocket-chains $c'\ d'$, operate the drive-shafts of the belts, each of the latter rollers having a sprocket-wheel $e'$, which is considerably larger than the sprocket-wheels $a'\ b'$, so as to give the belt-rollers a slower speed than the rotary cutters.
As above described, the upper part of the mass or stream of ingoing stalks is retarded during the feeding operation of the belts and cutters. This is effected by aprons $a^2\ b^2$, the former of which is fixed in position over the rear end of the main feed-belt and the cutter $p$ and the latter of which is located over the front part of the feed-belt and is adjustable at the will of the operator. The apron $a^2$ is secured at its front end to a cross-piece $a^3$ and may be set higher or lower by changing the bolt $a^4$, which holds it in position. The rear end of this apron is secured by hinges $b^3$ to a cross-strip $b^4$, which is secured to the arms $c^3$, in which the uppermost snapping-roller is usually mounted. The snapping-rollers are held together by springs $c^4$ in the usual way, and by reason of the fact that the rear end of the apron $a^2$ is secured to the strip $b^4$ it has a fixed relation to the upper one of these rolls and a yielding relation to the feed-belt and the ingoing corn. The adjustable apron $b^2$ is suspended at opposite ends by arms or links $e^2\ e^3$ from cross-bars $d^2\ d^3$, that are carried in side standards $x$, rising from the sills $a$. The cross-bar $d^3$ is carried by blocks $i^2$, which may be slid up and down in the standards and secured at different elevations by means of setscrews, as shown in Fig. 4, thereby providing for a bodily adjustment of the rear end of the apron vertically without changing its fore-and-aft position. The arms $e^3$ are fixed to the bar $d^3$; but it is immaterial whether the arms $e^2$ are fixed or pivoted to the bar $d^2$. As shown in Figs. 1 and 4, the front end of this apron flares upwardly so as to enlarge the entrance to the throatway for the stalks, and the entire apron is set on an incline so as to narrow this throatway toward the rear end, where the edge of the apron is preferably provided with teeth $p^2$. These teeth curve downwardly toward the main feeder-belt, and the apron is adapted to be adjusted lengthwise with respect to the belt independently of the vertical adjustment of its rear end. This is effected by providing one end of the cross-bar $d^3$ with a crank-arm $i^3$, so that by rocking the bar the whole apron may be swung on the links with a parallel motion and its vertical and horizontal position with respect to the feeder-belt be regulated as desired, so as to contract or enlarge the space between the belt and the under side of the apron, according as it is desired to retard the ingoing stalks or allow them to run free. The function of this apron $b^2$ requires that the adjustment just described be under the prompt control of the operator, and in order to permit this the crank-arm $i^3$ is provided with an operating-rod $i^4$, that extends out to the end of the feeder-belt frame $n$, where the operator stands. At this end the rod is notched, as shown in Fig. 4, and is thereby made adjustable to different positions in a keeper $i^5$, secured to the side of the frame.

In machines of this description it is desirable that the entire feeding mechanism should be capable of being thrown out of action at will of the operator as well as when the operator accidentally or carelessly gets into a position where he would be likely to get his hands or clothing caught in the cutters. I therefore provide across the end of the feeder-frame $n$ a curved bar $s^2$, which is pivoted to the side boards of the frame and has a short extension below its pivot that is connected by a rod $t^2$ to a clutch-shipping lever $x'$, that is pivoted to a bracket on one of the vertical posts of the machine-frame. This lever controls the connection of the pulley $s$ with the shaft $f$, and when the parts are in the position shown in the drawings the pulley is fast to the shaft. When, however, the operator pushes inward on the bar $s^2$ or when he carelessly or accidentally leans so far over the feeder as to endanger the safety of his person or clothing, his body contacts with the bar and operates the lever $s'$ to unclutch the pulley $s$ and stop the entire feeding and cutting mechanism.

Such being the construction and operation of the above-described machine, it is to be particularly noted that the principal function of the rotary cutter $p$ is to clear the throat in front of the snapping-rolls, which it is enabled to do by reason of its location immediately in front of the rolls and immediately in rear of the delivery end of the main feeder-belt $j$. In addition to this clearing function the cutter has also the further function of serving to aid the feeder-belt in delivering the stalks forward to the snapping-rolls. It may also be noted of the cutter $q$ that it serves as a spreader for the stalks and, considered merely as a band-cutter, it may be considered as an accessory which is unnecessary when it is preferred to cut the bands otherwise or when the machine is operating on material which is not bound in bundles. It is also to be noted that the invention is not limited to the inclined position of the main feeder-belt. It is shown herein arranged in this way principally because the inclination allows its receiving end to be located so as to catch the pieces of stalks and other scatterings from the cutter $q$. Obviously, however, it might be otherwise arranged with respect to this cutter and the auxiliary feeder without impairing its function.

Having thus described my invention, what I claim is—

1. The combination with the snapping-rolls, of an endless-belt feeder for delivering the stalks to the rolls, and a moving cutter located between the feeder and the rolls and adapted to assist the belt in forwarding the stalks and to prevent clogging at the entrance to the rolls.

2. The combination with the snapping-rolls, of an endless-belt feeder for delivering the stalks to the rolls, and a rotary cutter located between the feeder and the rolls and operating on the under side of the stalks to prevent clogging at the entrance to the rolls.

3. The combination with the snapping-rolls, of a main feeder-belt for delivering the stalks to the rolls, an auxiliary feeder-belt for delivering the stalks to the main belt, a band-cutter located between the main feeder and the auxiliary feeder, the receiving end of the main feeder extending under the cutter so as to catch the scattering therefrom.

4. The combination with the snapping-rolls, of an endless-belt feeder, a cutter between the belt and the rolls and operating under the stalks, an apron located above the cutter, and means for adjusting the position of the apron toward and from the cutter.

5. The combination with the snapping-rolls, of an endless feeder-belt, a stalk-cutter between the end of said belt and the rolls and operating under the stalks, an apron located above the cutter, a separate apron located above the belt, and means for adjusting said aprons with relation to the cutter and belt.

6. The combination with the snapping-rolls, of a main feeder-belt for delivering the stalks to the rolls, an auxiliary feeder-belt for delivering the stalks to the main belt, a band-cutter located between the belts and operating under the stalks, and an apron located above the cutter and adjustable toward and from it.

7. The combination with the feeder, of the apron $b^2$, suspended by links $e^2$, $e^3$, from cross-bars $d^2$, $d^3$, that are mounted on standards elevated above the feeder.

8. The combination of the apron $b^2$, the elevated cross-bars $d^2$, $d^3$, the links $e^2$, $e^3$, by means of which the apron is suspended from the cross-bars, and the crank-arm $i^3$ by means of which the bar $d^3$ may be rocked to adjust the position of the apron.

9. The combination of the standards $x$, the cross-bar $d^2$, the apron $b^2$ suspended at one end from the cross-bar by links $e^2$, the cross-bar $d^3$ mounted in slides $i^2$ adjustable on the rear standards, the links $e^3$ for suspending the front end of the apron from the bar $d^2$, and means for securing the slides in different vertical positions and rocking the bar $d^3$ to adjust the horizontal position of the apron.

10. The combination with the feeder-belt, of a bar $s^2$ extending across the end of the belt-frame, a rod $t^2$ connected at one end to an extension of the bar, a clutch-shipping lever to which the other end of the rod is connected, the belt $r$ which drives the feeder-belt, the shaft $f$, and the pulley $s$ adapted to be disconnected from the shaft by the shipping-lever.

11. The combination with the snapping-rolls, of an endless-belt feeder for delivering the stalks to the rolls, a rotary cutter located between the feeder and the rolls, and means for rotating the cutter toward the rolls so as to cause it to assist the belt in forwarding the stalks and to prevent clogging of the stalks at the entrance to the rolls.

In testimony whereof I affix my signature in presence of two witnesses.

CHARLES E. CURTISS.

Witnesses:
   CHAS. N. CHAMBERS,
   W. M. TWOMBLY.